Oct. 22, 1968     I. H. HOMILLER     3,406,591
COOLING APPARATUS
Filed Sept. 27, 1965
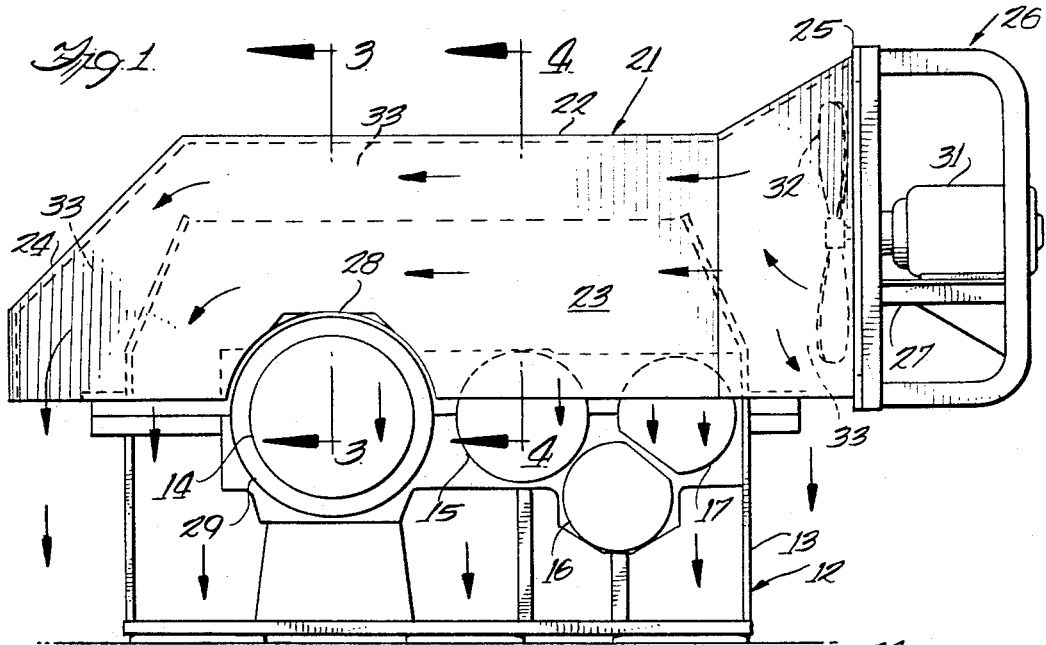
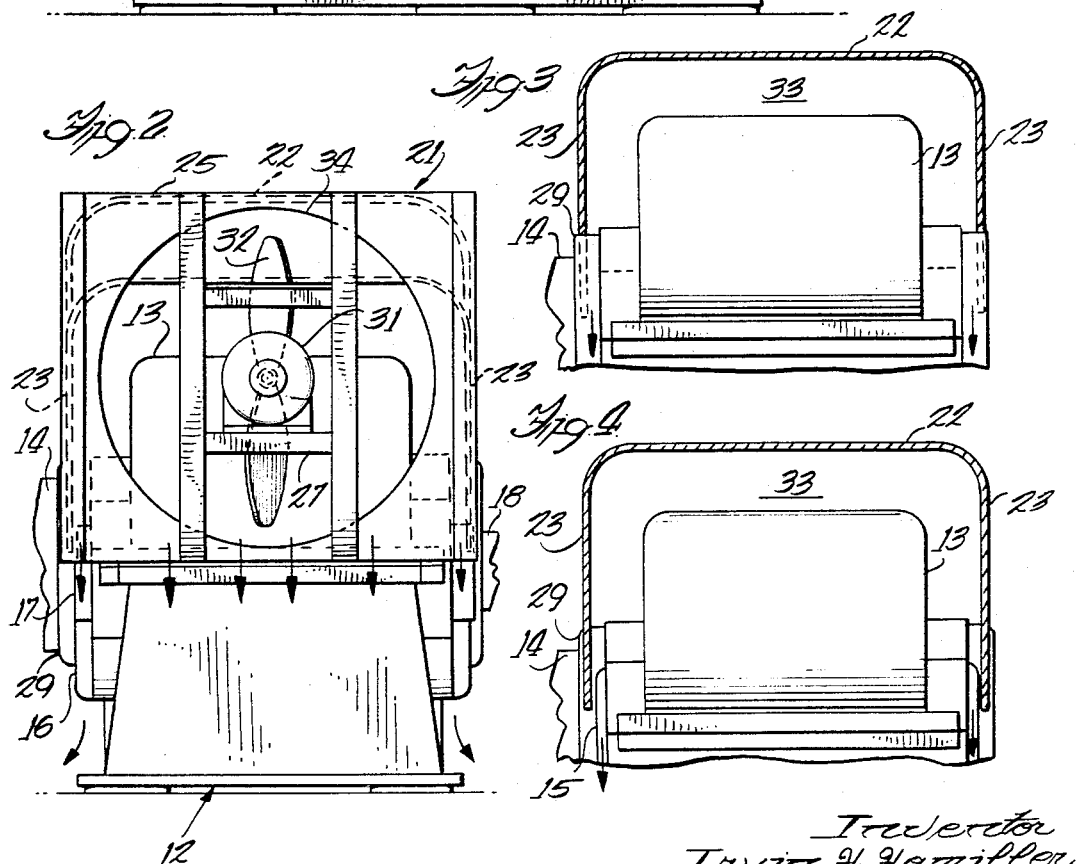
Inventor
Irvin H. Homiller
William Turner
Attorney United States Patent Office 3,406,591
Patented Oct. 22, 1968

3,406,591
COOLING APPARATUS
Irvin H. Homiller, Philadelphia, Pa., assignor to FMC Corporation, a corporation of Delaware
Filed Sept. 27, 1965, Ser. No. 490,605
1 Claim. (Cl. 74—606)

ABSTRACT OF THE DISCLOSURE

An apparatus for air cooling a gear housing employing an electrically driven fan arranged to force air into a shroud attached to and supported over the upper portions of the gear housing so as to direct the air flow from the fan over the exterior top, side, and end surfaces of the gear housing.

---

This invention relates generally to apparatus for cooling a drive unit and more particularly to apparatus for the cooling of the lubricant inside a gear housing by circulating air over the exterior top, side, and end surfaces of the housing.

During the normal operation of a mechanical speed reducer the retating gears generate heat within the gear housing and the lubricant contained therein. Due to this production of heat a speed reducer is rated in both thermal and mechanical horsepower, the thermal horsepower rating being that horsepower which a speed reducer may continually transmit without overheating. When a speed reducer is operated at values which exceed its thermal capacity, the excessive temperature developed thins the lubricant thus causing undue wear on the gears, bearings, and oil seals. This causes accelerated wear of the speed reducer resulting in a shortening of its useful life. It is therefore necessary that a speed reducer be selected for a particular application in accordance with its thermal horsepower rating rather than its higher mechanical horsepower rating.

The thermal horsepower rating of a speed reducer is lower than its associated mechanical horsepower rating, the difference between the two ratings increasing as the mechanical horsepower rating is increased. This results in the mechanical capacity of the selected speed reducer being greater than the application requires so as to operate the speed reducer within its thermal capacity. This results in inefficiency, increased initial cost and maintenance expenses, and the necessity of having to allow for a physically larger unit where space may be limited and at a premium.

It is therefore a primary object of this invention to provide an improved apparatus for cooling a gear housing.

Another object of this invention is to provide an apparatus that when attached to a gear housing will cause the forced circulation of air over the exterior top, side, and end surfaces of the housing for greatly improving the thermal conductivity to dissipate the heat generated by the gears and to thereby lower the lubricant operating temperature.

Another object of this invention is to provide improved cooling so that a smaller speed reducing unit having a lower mechanical rating may be used in applications presently requiring a larger unit due to the thermal horsepower rating.

Another object of this invention is to provide a cooling apparatus which may be easily attached to and removed from a gear housing without having to disconnect the speed reducer to allow for the periodic cleaning of the cooling apparatus and gear housing without having to interrupt the operating of the speed reducer.

Other object and advantages of this invention will be apparent during the course of the following description.

In the accompanying drawings forming a part of this specification, and in which like reference characters are employed to designate like parts throughout the same:

FIGURE 1 is a side elevational view showing a shroud assembly attached to a parallel shaft speed reducer with arrows indicating the direction of the forced air flow over the top, side, and end surfaces of the gear housing, FIGURE 2 is an end view of the assembly shown in FIG. 1, FIGURE 3 is a fragmentary sectional view taken on line 3—3 of FIG. 1, and FIGURE 4 is a fragmentary sectional view taken on line 4—4 of FIG. 1.

In the drawings, wherein for the purpose of illustration is shown a preferred embodiment of this invention, and first particularly referring to FIGS. 1 and 2, there is illustrated a parallel shaft speed reducer assembly 12 consisting of an enclosed and sealed gear housing 13, an output shaft 14, retainer caps 15, 16, and 17, and an input shaft 18. The input shaft is connected to the output shaft 14 by a gear train, not shown, partially submerged in the lubricant contained within the gear housing.

Mounted on the upper portion of the gear housing 13 is a shroud assembly 21 having a top 22, sides 23 and end 24 spaced from the corresponding portions of the gear housing by a distance sufficient to permit the free flow of air therebetween. Opposite the end 24 of the housing 13 is an apertured plate 25 having a support bracket 26 mounted on its outer side with a platform 27 adjacent the aperture in the plate. The plate 25 is spaced from the adjacent end of the gear housing 13 to permit the flow of air therebetween. The lower edges of the sides 23 are notched at 28 to receive the retainer caps 29 associated with the output shaft 14, and an additional notch, not shown, is provided in the side 23 adjacent the input shaft for clearance therebetween.

Mounted on the platform 27 is a motor 31, the shaft of which is aligned with the center of the aperture in the plate 25 and extends therethrough. A fan 32 is mounted on the shaft of the motor 31 adjacent the inner side of the plate 25.

The shroud assembly 21 completely covers the top and partially covers the sides and ends of gear housing 13, and is spaced from the housing to provide passageways 33 for the routing of the flow of air from the fan 32 over the top, side, and end surfaces of the housing. The path and direction of this air flow is indicated by the arrows on FIGS. 1–4 inclusive.

In accordance with the American Gear Manufacturers Association, thermal horsepower ratings are based upon an operating lubricant temperature rise of 70° F. above the ambient temperature, with a maximum total temperature of 180° F. By having the shroud assembly 21 direct the air flow from the fan 32 over the top, side, and end surfaces of the gear housing 13, the heat generated by the gears within the gear housing is quickly dissipated. This cooling effect allows the thermal horsepower rating of the speed reducer assembly 12 to be increased in value.

For example, a parallel shaft speed reducer without the invention attached on it was brought to a stabilized temperature condition above its thermal horsepower rating. The maximum temperature rises above the ambient temperature were then recorded as 86° F. in the lubricant reservoir and 69° F. on the exterior surfaces of the housing. The invention was then mounted to the upper portion of the housing of the parallel shaft speed reducer and the above described test was repeated with the fan 32 in operation. After the temperatures were stabilized the maximum temperature rises above the ambient temperature were recorded as 29° F. in the lubricant reservoir and 5° F. on the exterior surface of the housing. It can therefore be seen that by using the invention it is possible to greatly increase the thermal horsepower rating of the speed reducer to correspond with its increased thermal capacity.

As an additional example to illustrate the importance of the design of the shroud assembly to direct the air flow over the top, side, and end surfaces of the housing, a parallel shaft speed reducer having the invention mounted to its upper portion was brought to a stabilized temperature condition with the fan operating at 1800 r.p.m. The fan speed was then increased to 3600 r.p.m. until once again constant temperatures were obtained. At 1800 r.p.m. the maximum temperature rises above ambient were 30° F. in the lubricant reservoir and 22° F. on the exterior surface of the housing, whereas at 3600 r.p.m. the maximum temperature rises above ambient were 29° F. in the lubricant reservoir and 5° F. on the exterior surface of the housing. This illustrates that it is primarily the design of the shroud assembly rather than the speed of the air flowing over the housing which provides the desired improved cooling of the lubricant in the speed reducer.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. Apparatus for cooling a drive device employing gears enclosed in a housing having exterior top, bottom, side, and end surfaces, said cooling apparatus comprising:

a shroud having a top member, side members, and end members interconnected to form a covering for the drive device housing, support means on said shroud for removably mounting said shroud on the housing in spaced relationship therewith so that the top member of the shroud covers the top surface of the housing, and the side members and end members of the shroud cover the upper portions of the side surfaces and end surfaces respectively of the housing, fan means mounted on said shroud for introducing air into the space between said shroud and the housing for flow across the top, side, and end surfaces of the housing, and means for driving said fan.

References Cited

UNITED STATES PATENTS

| | | | |
|---|---|---|---|
| 1,809,327 | 6/1931 | Badgley | 74—606 |
| 2,391,186 | 12/1945 | Noble | 74—606 |
| 2,481,914 | 9/1949 | Eastman et al. | 74—606 |
| 2,696,074 | 12/1954 | Dolza | 74—606 X |
| 2,771,268 | 10/1956 | Rosewall | 74—606 |
| 3,005,357 | 10/1961 | Christian | 74—606 X |

FRED C. MATTERN, JR., *Primary Examiner.*

W. S. RATLIFF, *Assistant Examiner.*